United States Patent
Guo et al.

(10) Patent No.: US 12,548,125 B1
(45) Date of Patent: Feb. 10, 2026

(54) REDUCING NOISE IN VIDEO FRAMES

(71) Applicant: Zoom Video Communications, Inc., San Jose, CA (US)

(72) Inventors: Yi Guo, Zhejiang (CN); Zhichu He, Zhejiang (CN); Rui Li, Zhejiang (CN); Bo Ling, Saratoga, CA (US); Jing Wu, Zhejiang (CN); Minxia Yang, Zhejiang (CN); Yichen Zhang, Zhejiang (CN)

(73) Assignee: Zoom Communications, Inc., San Jose, CA (US)

( * ) Notice: Subject to any disclaimer, the term of this patent is extended or adjusted under 35 U.S.C. 154(b) by 315 days.

(21) Appl. No.: 18/203,701

(22) Filed: May 31, 2023

(51) Int. Cl.
G06T 5/70 (2024.01)
G06T 9/00 (2006.01)

(52) U.S. Cl.
CPC ...... *G06T 5/70* (2024.01); *G06T 2207/20021* (2013.01); *G06T 2207/20024* (2013.01); *G06T 2207/20076* (2013.01)

(58) Field of Classification Search
None
See application file for complete search history.

(56) References Cited

U.S. PATENT DOCUMENTS

| | | | | |
|---|---|---|---|---|
| 9,462,282 | B2 * | 10/2016 | Sasai | H04N 19/197 |
| 10,425,642 | B1 * | 9/2019 | Wu | H04N 19/126 |
| 10,841,620 | B1 * | 11/2020 | Wu | H04N 19/132 |
| 2021/0352288 | A1 * | 11/2021 | Toma | H04N 19/117 |
| 2022/0038693 | A1 * | 2/2022 | Zhang | H04N 19/176 |
| 2022/0038703 | A1 * | 2/2022 | Kato | H04N 19/18 |
| 2024/0022722 | A1 * | 1/2024 | Zhang | H04N 19/105 |
| 2025/0133236 | A1 * | 4/2025 | Xie | H04N 19/132 |

OTHER PUBLICATIONS

Ferdowsi et al. "Regularized Residual Quantization: a multi-layer sparse dictionary learning approach", arXiv: 1705.00522v1 [cs.LG] May 1, 2017 (Year: 2017).*
Abrahamsson, "Variance Adaptive Quantization and Adaptive Offset Selection in High Efficiency Video Coding", Uppsala Universitet, Examensarbete 30 hp, Feb. 2016 (Year: 2016).*

\* cited by examiner

*Primary Examiner* — Randolph I Chu
(74) *Attorney, Agent, or Firm* — Kilpatrick Townsend & Stockton LLP

(57) ABSTRACT

Noise can be reduced in video frames by performing one or more techniques described herein. For example, a system can divide a video frame into a set of blocks, determine a variance associated with a selected block, generate first frequency residuals associated with the selected block, and determine whether the variance is below a predefined threshold. If the variance is below the predefined threshold, the system can adjust an offset to be used during a quantization operation from a first offset value to a second offset value. The system can then apply the quantization operation to the first frequency residuals using the second offset value, to thereby generate second frequency residuals. Using the second offset value during the quantization operation can result in the second frequency residuals having a larger number of zero-valued frequency residuals, which in turn can reduce noise with respect to the selected block.

17 Claims, 8 Drawing Sheets

REDUCING NOISE IN VIDEO FRAMES

TECHNICAL FIELD

The present application generally relates to video encoding and, more particularly, relates to techniques for reducing noise in video frames.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
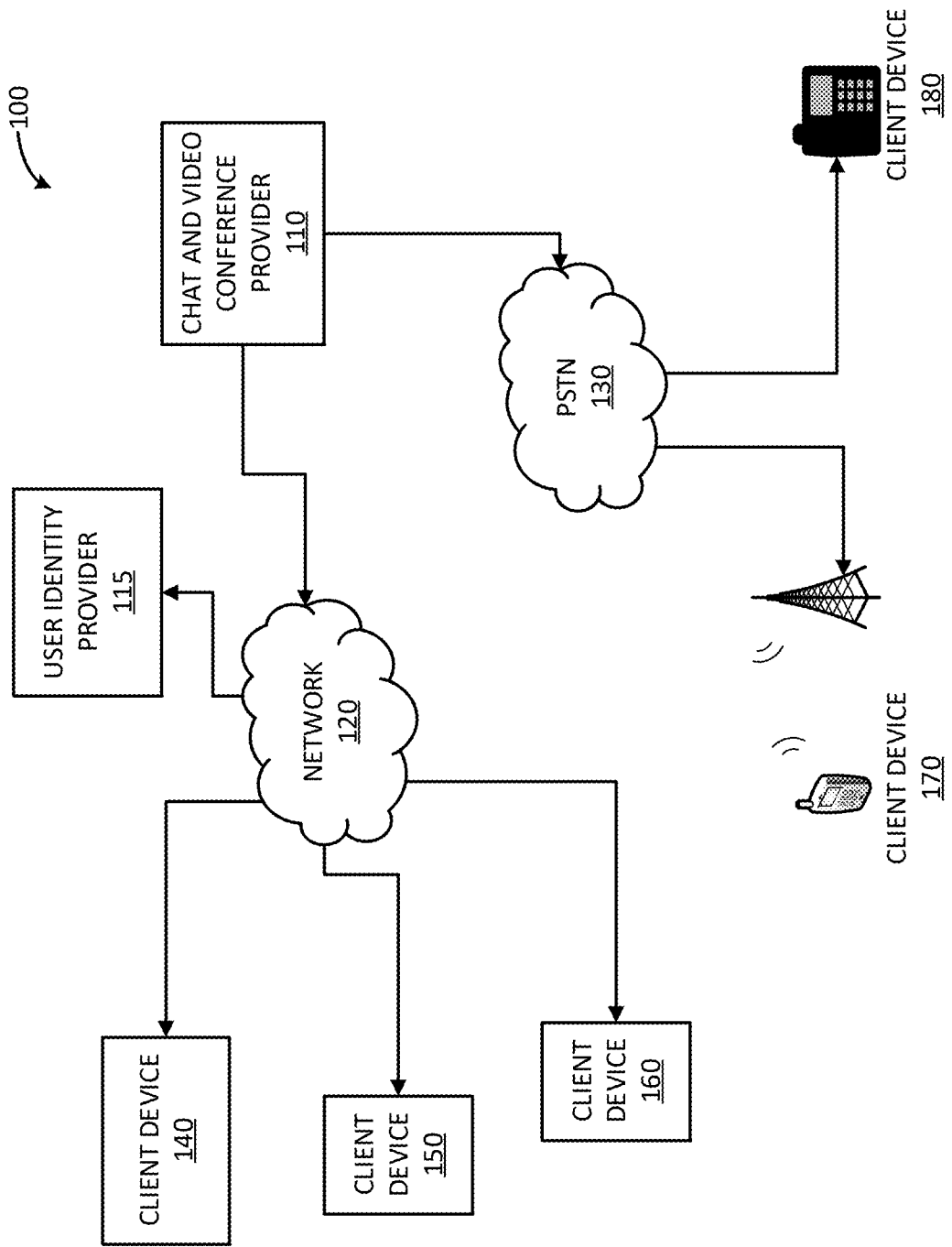
FIG. 1 shows an example of a system for providing videoconferencing and chat functionality to various client devices according to some aspects of the present disclosure.

Examples are described herein in the context of reducing noise in video frames. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, without having to be at the same physical location. Participants can be invited to a videoconference meeting, join from their personal computers or telephones, and are able to see and hear each other and converse largely as they would during an in-person group meeting or event. In particular, the participants receive audio and video streams from the other participants and are presented with views of the video streams and audio from the audio streams. Using these different modalities, the participants can see and hear each other, engage more deeply, and generally have a richer experience despite not being physically in the same space.

During a videoconference, the video streams may undergo some level of compression for various reasons, such as to reduce network bandwidth usage, latency, or lag. This compression is normally performed by a video encoder on the client device that is providing the video stream. After compressing the video stream, the client device transmits the compressed video stream to the other client devices associated with the other participants in the videoconference. Those client devices can then decompress the compressed video stream using their respective video decoders.

Although there are many different kinds of compression techniques, a typical compression process will normally involve an initial blocking operation in which a video frame is divided into rectangular blocks of pixels. These blocks can be 128×128 pixels, 64×64 pixels, 32×32 pixels, 8×8 pixels, 4×4 pixels, or other sizes. These blocks may be referred to as superblocks or macroblocks, depending on their size. Then prediction methods are used for these blocks, which generate prediction blocks. The difference between prediction blocks and original blocks is the prediction residual or spatial residual. Based on the prediction residual, a transform operation is performed in which a transform function (e.g., a discrete cosine transform or a discrete wavelet transform) is applied to each prediction residual block, to transform the block into frequency-domain coefficients. For example, if the blocks are 8×8 pixels, the transform function would operate on 64 input prediction residuals and yield 64 frequency-domain coefficients. These frequency-domain coefficients can be referred to as frequency residuals, since they represent residuals in the frequency domain, as described in greater detail later on. After the transform operation, a quantization operation can be performed to quantize the frequency residuals. During the quantization operation, a quantization offset may be added to each frequency residual to produce an adjusted frequency residual. The adjusted frequency residual is then compared to a predefined quantization threshold. Adjusted frequency residuals that fall below the quantization threshold are set to zero. The other residuals are also quantized to a non-zero value. Thus, following quantization, more of the frequency residuals may have values of zero than prior to quantization. After the quantization operation, a coding operation may be used to transform the quantized frequency residuals into bit stream. The bit stream is a stream that consist of bits. Examples of the coding operation can include run-length encoding, variable-length encoding, arithmetic coding, etc.

When a compression process is applied to a video stream, it can produce various kinds of artifacts that can reduce the quality of the video stream. There are two main types of compression artifacts-spatial artifacts and temporal artifacts. Spatial artifacts are location based. Examples of spatial artifacts can include basis patterns, pixelating, color bleeding, spatial noise, and blurring. Temporal artifacts are time/sequence based. Examples of temporal artifacts can include flickering, jerkiness, temporal noise such as mosquito noise, and floating such as edge floating or texture floating. Both types of compression artifacts can be disruptive, annoying, and subjectively displeasing to viewers of the video stream.

Because compression artifacts can degrade the perceived quality of a video, it can be desirable to reduce or eliminate them as much as possible. To that end, some examples of the present disclosure can help alleviate spatial noise in a video, such as a video stream or a recorded video. For example, a system can first divide a video frame (e.g., an image) into blocks. For each block, the system can compute a variance for the block and determine whether the variance is less than a predefined threshold. If the variance is less than the predefined threshold, the system can reduce the quantization offset from a first offset value to a second offset value when performing the quantization operation on the block. This reduction can cause more of the adjusted frequency residuals to fall below the quantization threshold, so that they are quantized to zero. Frequency residuals with a value of zero are referred to herein as zero-valued frequency residuals. Frequency residuals with a positive or negative value are referred to herein as non-zero valued frequency residuals. After performing the quantization operation, the system can then perform any additional encoding operations to finish encoding the block. By reducing the total number of non-zero valued frequency residuals that undergo the additional encoding operations, the system can alleviate (e.g., avoid or reduce) spatial noise associated with the block. This process can be repeated for each block in the video frame to reduce noise in the video frame.

If the system determines that a block in a video frame has a variance that is less than the predefined threshold, the system may also perform other operations with respect to the block to help alleviate noise. For example, the system may apply a smoothing filter to the block's pixels to generate smoothed pixels. Examples of the smoothing filter can include a Gaussian filter, a mean filter, or a median filter. Performing this initial smoothing operation can help eliminate noise from the block. The effects of the smoothing operation can also impact downstream operations applied to the block. For example, the system can use the smoothed pixels to generate spatial prediction residuals, which are prediction residuals in the spatial domain. The system can then perform a transformation operation on the spatial residuals to transform them into frequency-domain coefficients, also referred to herein as frequency residuals. The system can then perform the quantization operation (e.g., with the second offset value) on the frequency residuals. Thus, the initial smoothing can impact later encoding operations, such as the transformation and quantization operations.

This illustrative example is given to introduce the reader to the general subject matter discussed herein and the disclosure is not limited to this example. The following sections describe various additional non-limiting examples.

FIG. 1 shows an example of a system 100 for providing videoconferencing and chat functionality to various client devices according to some aspects of the present disclosure. The system 100 includes a chat and videoconference provider 110 that is connected to multiple communication networks 120 and public switched telephone network (PSTN) 130, through which various client devices 140-180 can participate in videoconferences hosted by the chat and videoconference provider 110. For example, the chat and videoconference provider 110 can be located within a private network to provide video conferencing services to devices within the private network, or it can be connected to a public network, e.g., the internet, so it may be accessed by anyone. Some examples may even provide a hybrid model in which a chat and videoconference provider 110 may supply components to enable a private organization to host private internal videoconferences or to connect its system to the chat and videoconference provider 110 over a public network.

It should be understood that in some examples, the chat and videoconference provider 110 may be a chat provider providing only a chat functionality, while in other example examples, the chat and videoconference provider 110 may be a videoconference provider providing only video conferencing functionality. Furthermore, although the chat and videoconference provider 110 are shown as one entity, other configurations are considered. For example, a chat provider may have a structure similar to that of chat and videoconference provider 110, and a videoconference provider may also have a structure similar to the chat and videoconference provider 110. The chat provider and the videoconference provider may be connected through the same network (e.g., the network 120), or may be operable to communicate with each other through another shared network.

The system optionally also includes one or more user identity providers, e.g., user identity provider 115, which can provide user identity services to users of the client devices 140-160 and may authenticate user identities of one or more users to the chat and videoconference provider 110. In this example, the user identity provider 115 is operated by a different entity than the chat and videoconference provider 110, though in some examples, they may be the same entity.

In some examples, the chat and videoconference provider 110 may provide a chat functionality. In such examples, the chat and videoconference provider 110 may allow a user to create one or more chat channels where the user may exchange messages with other users that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and videoconference provider 110 may provide permission to a user and/or an owner of the chat channel may provide permission to the user. Furthermore, there may be any number of users permitted in the chat channel.

Figure 2:
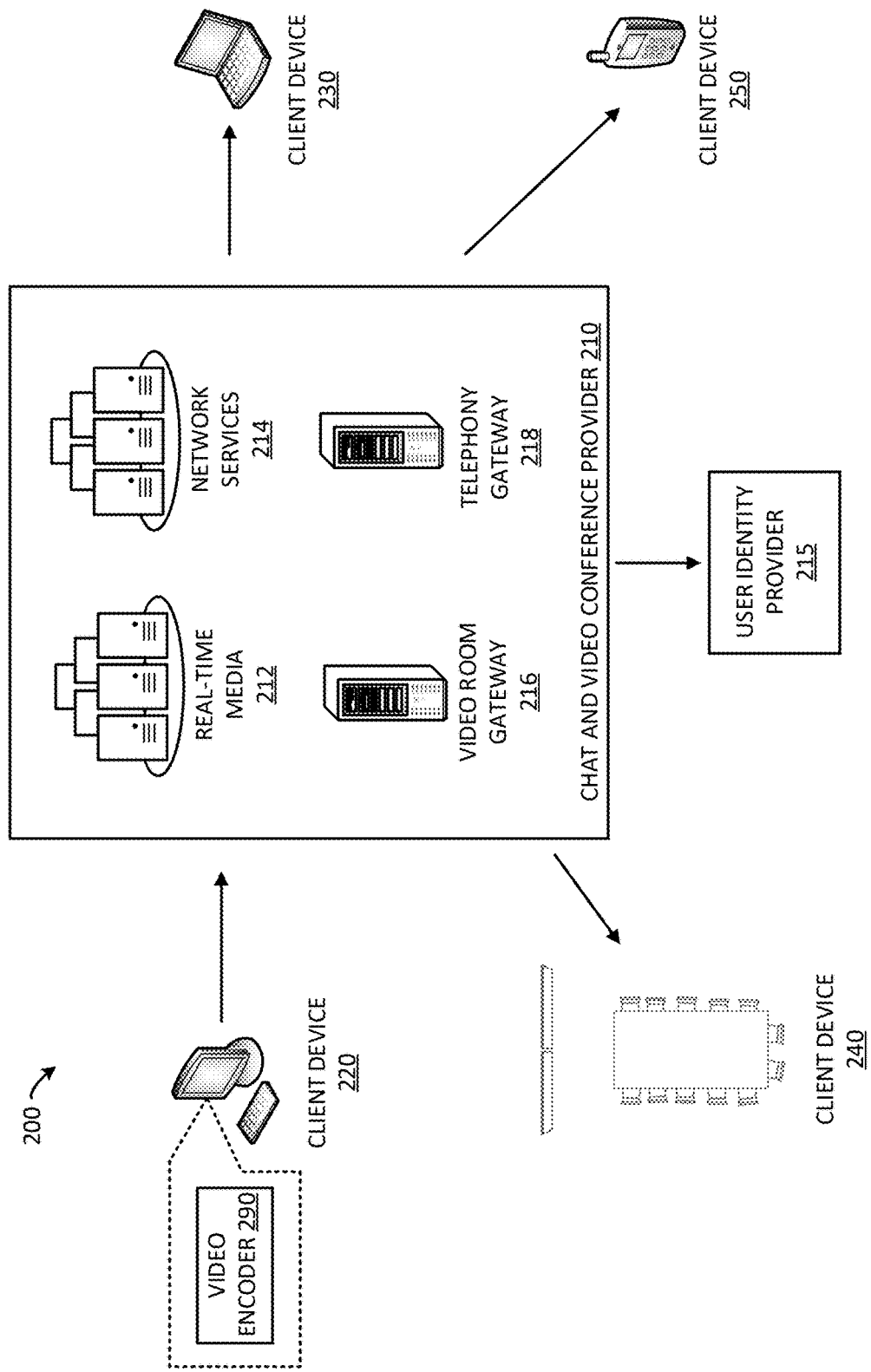
FIG. 2 shows another example of a system for providing videoconferencing and chat functionality to various client device according to some aspects of the present disclosure.

The chat and videoconference provider 110 may also provide video conferencing functionality. For example, the chat and videoconference provider 110 may allow clients to create videoconference meetings (or "meetings") and invite others to participate in those meetings as well as perform other related functionality, such as recording the meetings, generating transcripts from meeting audio, manage user functionality in the meetings, enable text messaging during the meetings, etc. FIG. 2, described below, provides a more detailed description of the architecture and functionality of the chat and videoconference provider 110.

Meetings in this example chat and videoconference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

Chat channels may be provided by the chat and videoconference provider 110 to which participants are connected. Similar to the meetings discussed above, the chat channels are constructs provided by a server where the messages are received then directed to the various participants. The messages may include text, audio files, video files, image files, or any other electronic file type.

To create a meeting with the chat and videoconference provider 110, a user may contact the chat and videoconference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the chat and videoconference provider 110 may prompt the user for certain information, such as a date, time, and duration for the meeting, a number of participants, a type of encryption to use, whether the meeting is confidential or open to the public, etc. After receiving the various meeting settings, the chat and videoconference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The chat and videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the chat and videoconference provider 110. The client devices also receive audio or video information from the chat and videoconference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The chat and videoconference provider 110 may also invalidate the meeting information, such as the meeting identifier or password/passcode.

The chat and videoconference provider 110 may use a similar process as is used to create a meeting to create a chat channel. A user may contact the chat and videoconference provider 110 using a client device 140-180 and select an option to create a chat channel. Such an option may be provided in a webpage accessed by a client device 140-160 or client application executed by a client device 140-160. To create the chat channel, the chat and videoconference provider 110 may prompt the user for certain information, a number of participants, a type of encryption to use, whether the chat channel is confidential or open to anyone, a title or subject, etc. After receiving the various chat channel settings, the chat and videoconference provider may create a record for the chat channel and generate a chat identifier to one or more user invited to the chat channel. In some examples, the certain information associated with the chat channel may be automatically generated by the chat and videoconference provider 110.

To provide such functionality, one or more client devices 140-180 may communicate with the chat and videoconference provider 110 using one or more communication networks, such as network 120 or the PSTN 130. The client devices 140-180 may be any suitable computing or communications device that have audio or video capability. For example, client devices 140-160 may be conventional computing devices, such as desktop or laptop computers having processors and computer-readable media, connected to the chat and videoconference provider 110 using the internet or other suitable computer network. Suitable networks include the internet, any LAN, MAN, WAN, cellular network (e.g., 3G, 4G, 4G LTE, 5G, etc.), or any combination of these. Other types of computing devices may be used instead or as well, such as tablets and/or smartphones.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and videoconference provider 110. It should be appreciated that certain computing devices may also provide telephony functionality and may operate as telephony devices. For example, smartphones typically provide cellular telephone capabilities and thus may operate as telephony devices in the system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these client devices 140-160 contact the chat and videoconference provider 110 using network 120 and may provide information to the chat and videoconference provider 110 to access functionality provided by the chat and videoconference provider 110, such as access to create new meetings/chat channels or join existing meetings/chat channels. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and videoconference provider 110.

A user identity provider 115 may be any entity trusted by the chat and videoconference provider 110 that can help identify a user to the chat and videoconference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a healthcare provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and videoconference provider 110.

When the user accesses the chat and videoconference provider 110 using a client device, the chat and videoconference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and videoconference provider 110 either provides or denies access to its services, respectively.

For telephony devices, e.g., client devices 170-180, the user may place a telephone call to the chat and videoconference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and videoconference provider 110. For example, telephony devices may be unable to provide user identification information to identify the telephony device or the user to the chat and videoconference provider 110. Thus, the chat and videoconference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak or share content in a meeting or chat, hear or view certain content shared in the meeting, or access other meeting functionality.

It should be appreciated that users may choose to participate in meetings anonymously and decline to provide user identification information to the chat and videoconference provider 110, even in cases where the user has an authenticated identity and employs a client device capable of identifying the user to the chat and videoconference provider 110. The chat and videoconference provider 110 may determine whether to allow such anonymous users to use services provided by the chat and videoconference provider 110. Anonymous users, regardless of the reason for anonymity, may be restricted as discussed above with respect to users employing telephony devices, and in some cases may be prevented from accessing certain meetings or other services, or may be entirely prevented from accessing the chat and videoconference provider 110.

Referring again to chat and videoconference provider 110, in some examples, it may allow client devices 140-160 to encrypt their respective chat and/or video and audio streams to help improve privacy in their meetings. Encryption may be provided between the client devices 140-160 and the chat and videoconference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and videoconference provider 110, while allowing the chat and videoconference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and videoconference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and videoconference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Now referring to FIG. 2, shown is an example of a system 200 in which a chat and videoconference provider 210 provides videoconferencing functionality to various client devices 220-250 according to some aspects of the present disclosure. The client devices 220-250 include two conventional computing devices 220-230, dedicated equipment for a videoconference room 240, and a telephony device 250. Each client device 220-250 communicates with the chat and videoconference provider 210 over a communications network, such as the internet for client devices 220-240 or the PSTN for client device 250, generally as described above with respect to FIG. 1. The chat and videoconference provider 210 is also in communication with one or more user identity providers 215, which can authenticate various users to the chat and videoconference provider 210 generally as described above with respect to FIG. 1.

In this example, the chat and videoconference provider 210 employs multiple different servers (or groups of servers) to provide different chat and/or videoconference functionality, thereby enabling the various client devices to create and participate in chat channels and/or videoconference meetings. The chat and videoconference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more chat channels and/or videoconference meetings to the client devices 220-250.

The real-time media servers 212 provide multiplexed multimedia streams to meeting participants, such as the client devices 220-250 shown in FIG. 2. While chat and/or video and audio streams typically originate at the respective client devices, they are transmitted from the client devices 220-250 to the chat and videoconference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various chat and/or video and audio streams based on the target client device and communicate multiplexed streams to each client device. For example, the real-time media servers 212 receive chat and/or audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the chat and/or audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the chat and videoconference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and videoconference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and videoconference provider 210 may allow a meeting participant to notify it of inappropriate behavior or content in a meeting. Such a notification may trigger the real-time media servers to 212 record a portion of the meeting for review by the chat and videoconference provider 210. Still other functionality may be implemented to take actions based on the decrypted multimedia streams at the chat and videoconference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and videoconference provider 210 via local real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the chat and videoconference provider 210 and across many different real-time media servers 212.

Turning to the network services servers 214, these network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and videoconference provider under a supervisory set of servers. When a client device 220-250 accesses the chat and videoconference provider 210, it will typically communicate with one or more network services servers 214 to access their account or to participate in a meeting.

When a client device 220-250 first contacts the chat and videoconference provider 210 in this example, it is routed to a network services server 214. The client device may then provide access credentials for a user, e.g., a username and password or single sign-on credentials, to gain authenticated access to the chat and videoconference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and videoconference provider 210, or scheduling a new meeting, by interacting with the network services servers 214.

In some examples, users may access the chat and videoconference provider 210 anonymously. When communicating anonymously, a client device 220-250 may communicate with one or more network services servers 214 but only provide information to create or join a meeting, depending on what features the chat and videoconference provider allows for anonymous users. For example, an anonymous user may access the chat and videoconference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

The chat and videoconference provider 210 may use a similar process to that which is used to schedule a meeting (as described above) to create a chat channel. A user may contact the chat and videoconference provider 210 using a client device 220 and select an option to create a chat channel. After receiving various chat channel settings (e.g. a title, a participant list, etc.), the chat and videoconference provider may create a record for the chat channel and generate a chat identifier to invite one or more users to the chat channel. In some examples, the certain information associated with the chat channel may be automatically generated by the chat and videoconference provider 210.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting and/or a chat channel, client devices will send and receive multimedia streams via the real-time media servers 212, but they may also communicate with the network services servers 214 as needed during meetings. For example, if the host leaves the meeting or chat channel, the network services server(s) 214 may appoint another user as the new meeting host and assign host administrative privileges to that user. Hosts may have administrative privileges to allow them to manage their chat channels and/or meetings, such as by enabling or disabling screen sharing, muting or removing users from the meeting, assigning or moving users to the chat channel or meeting, recording meetings, etc. Such functionality may be managed by the network services server(s) 214.

For example, if a host wishes to remove a user from a chat channel, they may identify the user and issue a command through a user interface on their client device. The command may be sent to a network services server 214, which may then disconnect the identified user from the corresponding real-time media server 212. If the host wishes to move one or more participants into a meeting or chat channel, such a command may also be handled by a network services server 214, which may provide authentication information to the one or more participants for joining the chat channel and then connect the one or more participants to the chat channel. In some examples, a chat channel may not have a host.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request. Similar steps may be taken for ending a chat channel. For example, after receiving a command to terminate a chat channel, the network services server 214 communicate with the real time media server(s) 212 to stop a messaging service for the chat channel and remove any users from the chat channel records.

Depending on the functionality provided by the chat and videoconference provider, the network services server(s) 214 may provide additional functionality, such as by providing private chat and meeting capabilities for organizations, special types of meetings (e.g., webinars), etc. Such functionality may be provided according to various examples of chat and video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive chat and/or video and audio streams from each of the cameras and microphones and connect with the chat and videoconference provider 210. For example, the video conferencing hardware may be provided by the chat and videoconference provider to one or more of its subscribers, which may provide access credentials to the video conferencing hardware to use to connect to the chat and videoconference provider 210.

The video room gateway servers 216 provide specialized authentication and communication with the dedicated video conferencing hardware that may not be available to other client devices 220-230, 250. For example, the video conferencing hardware may register with the chat and video-conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and videoconference provider 210.

Referring now to the telephony gateway servers 218, these servers 218 enable and facilitate telephony devices' participation in meetings hosed by the chat and videoconference provider 210. Because telephony devices communicate using the PSTN and not using computer networking protocols, such as TCP/IP, the telephony gateway servers 218 act as an interface that converts between the PSTN and the networking system used by the chat and videoconference provider 210.

For example, if a user uses a telephony device to connect to a meeting, they may dial a phone number corresponding to one of the chat and videoconference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and videoconference provider 210 discussed above are merely examples of such devices and an example architecture. Some chat and videoconference providers may provide more or less functionality than described above and may not separate functionality into different types of servers as discussed above. Instead, any suitable servers and network architectures may be used according to different examples.

Figure 3:
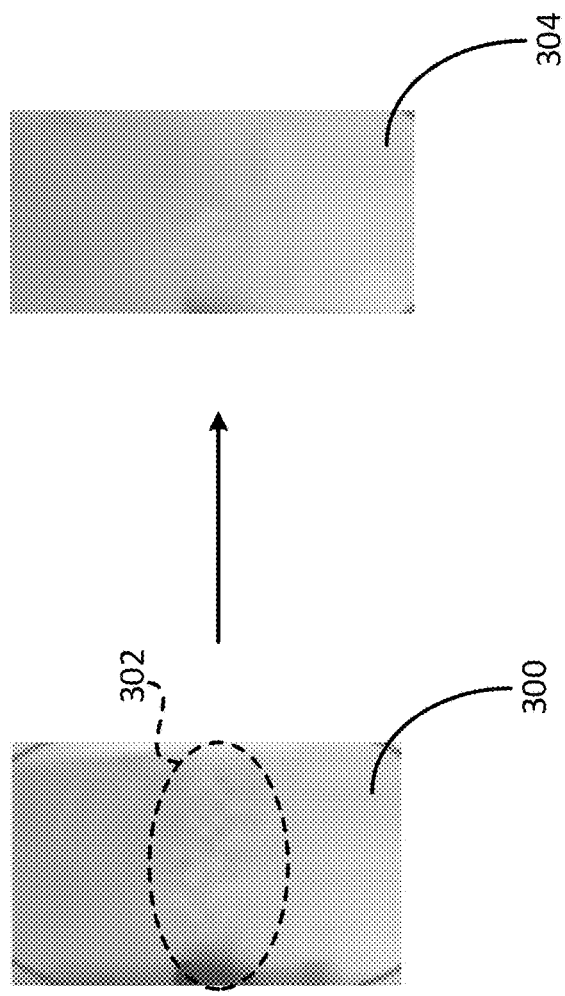
FIG. 3 shows an example of noise in a video frame according to some aspects of the present disclosure.

During a videoconference, a camera coupled to a client device 220 can capture video frames. If a video frame is compressed by a video encoder 290, shown in FIG. 2, before it is sent to the other client devices 230-250, the video compression may result in noise that is displeasing to the participants. An example of such a video frame 300 with noise 302 is shown in FIG. 3. This noise 302 can reduce the quality of the video stream. So, the client device 220 (e.g., the video encoder 290) can implement the following process to alleviate the noise 302, which may result in a cleaner video frame 304 with less noise.

Figure 4:
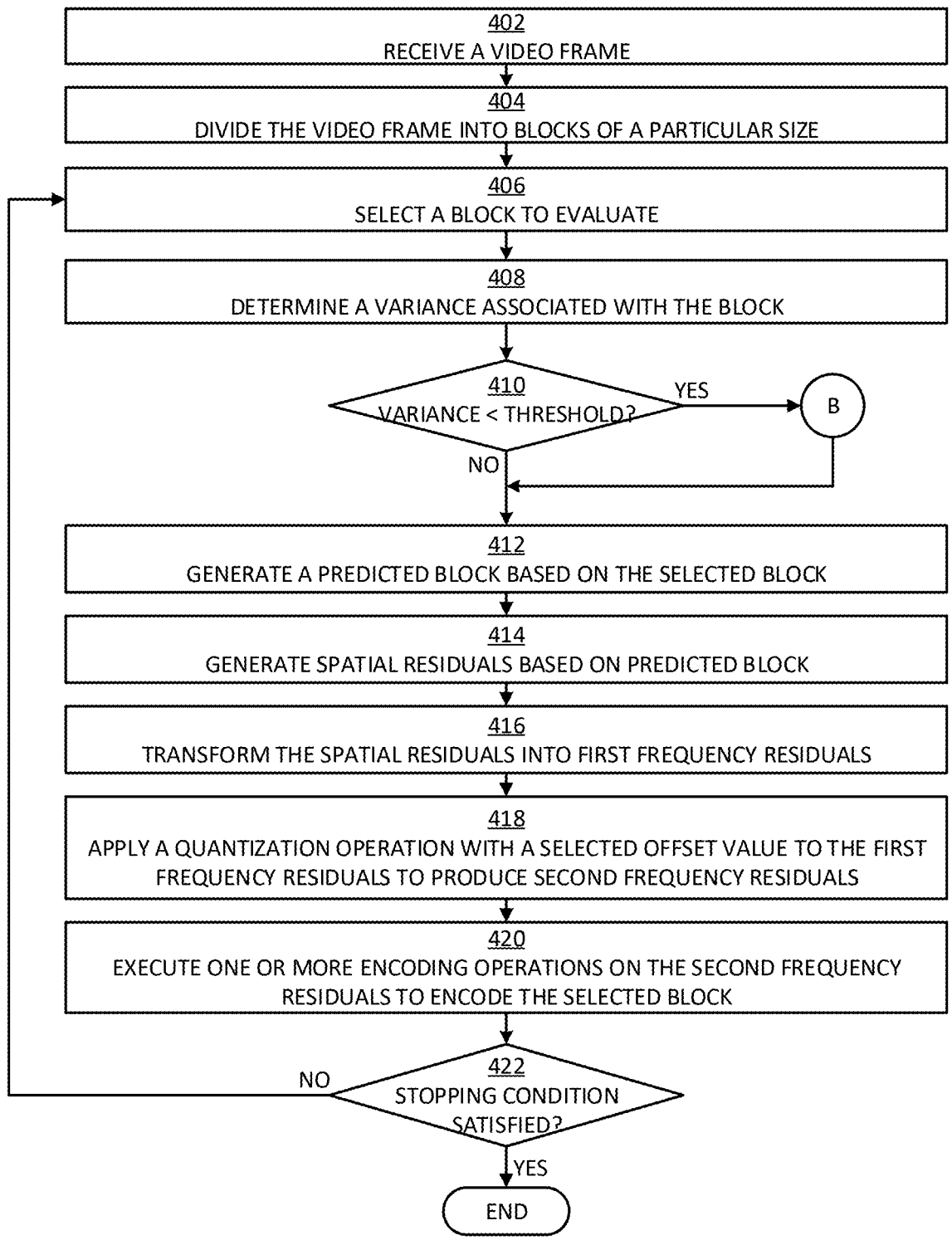
FIG. 4 shows a flowchart of an example of a process for reducing noise in video frames according to some aspects of the present disclosure.

Referring now to FIG. 4, shown is a flowchart of an example of a process for reducing noise in video frames according to some aspects of the present disclosure. Other examples may involve more steps, fewer steps, different steps, or a different sequence of steps than is shown in FIG. 4. The steps of FIG. 4 may be at least partially performed by a processor of a client device, such as any of the client devices 140-170 of FIG. 1 or the client devices 220-240 of FIG. 2. Additionally or alternatively, the steps of FIG. 4 may be at least partially performed by another component of the system 200 shown in FIG. 2.

In step 402, the processor receives a video frame. The video frame can be associated with a video stream, a pre-recorded video, etc. The processor can receive the video frame from any suitable source, such as a camera coupled to the client device. In some examples involving a videoconference, the video frame may be captured by a webcam coupled to the client device, where client device can be operated by a participant in the videoconference. The video frame may depict the participant as well as other objects.

Figure 5:
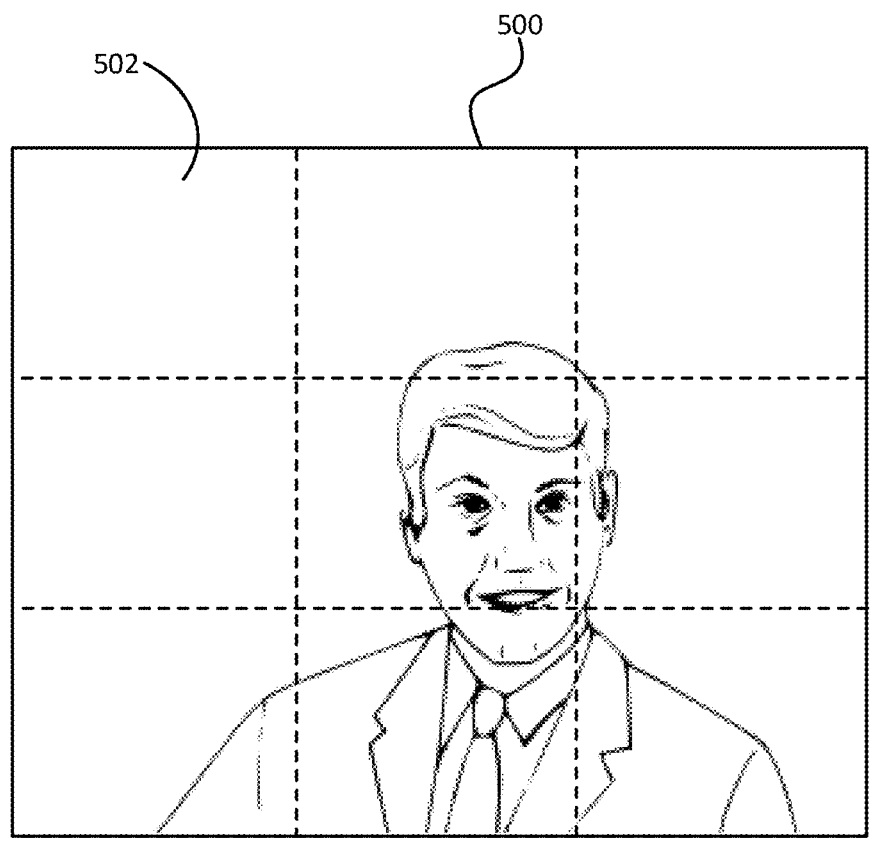
FIG. 5 shows an example of blocks associated with a video frame according to some aspects of the present disclosure.

In step 404, the processor divides the video frame into blocks of a particular size. For example, the processor can separate the content of the video frame into adjacent blocks, which may be square shaped and of the same size. The size of the blocks can depend on various factors, such as the size of the video frame. Examples of block sizes can include 128×128 pixels or 64×64 pixels. One example of a video frame 500 divided into blocks 502 is shown in FIG. 5.

In step 406, the processor selects a block to evaluate. The processor can select the block using any suitable selection technique, such as by incrementally or randomly selecting blocks in the video frame.

Figure 6:
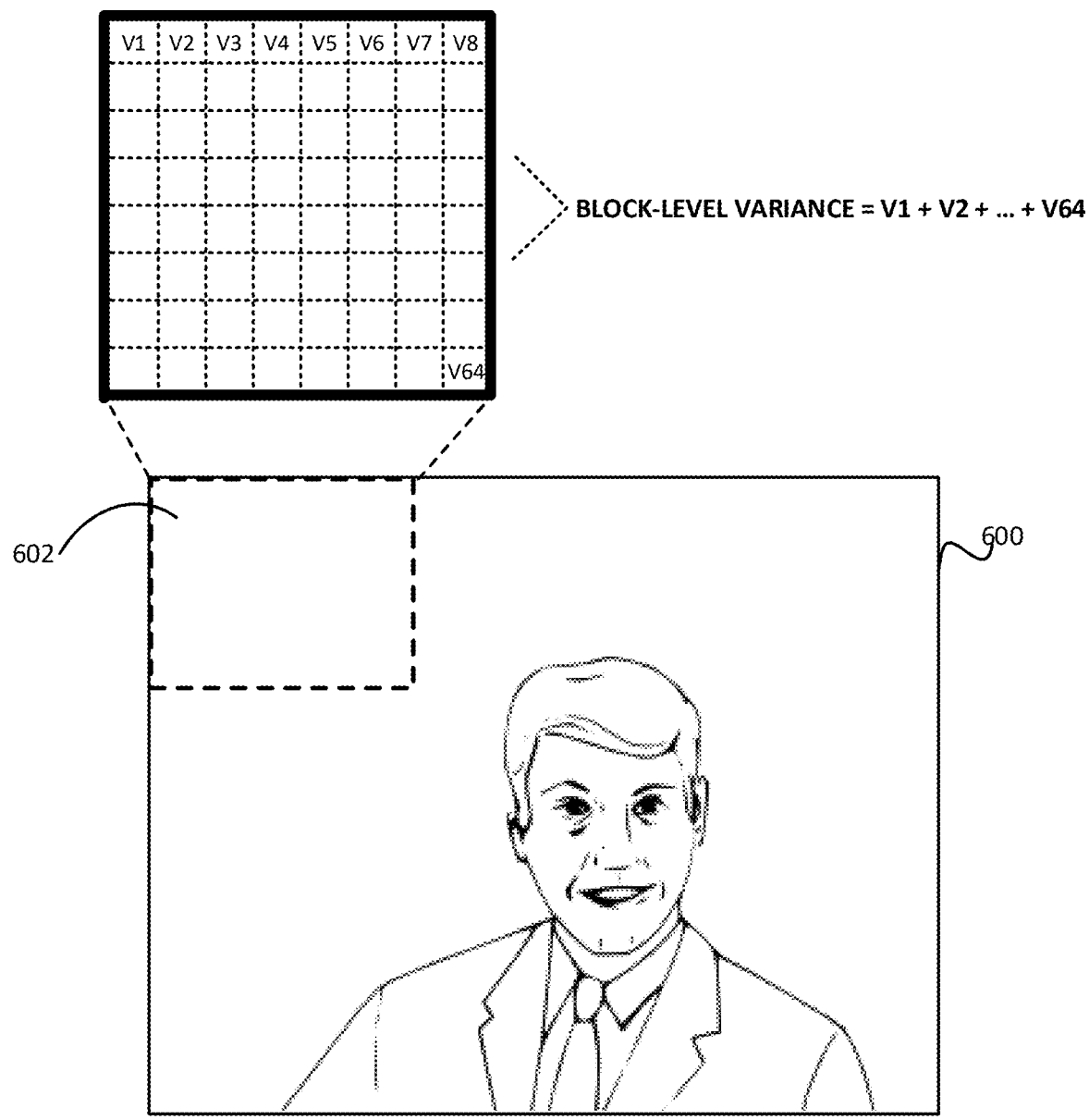
FIG. 6 shows an example of a process for computing a variance associated with a block according to some aspects of the present disclosure.

In step 408, the processor determines a variance associated with the selected block. For example, the processor can determine an average pixel value for the selected block, where the average pixel value is an average (e.g., mean) of all of the pixel values in the block. The processor can then determine a pixel-level variance associated with each pixel in the block based on the average pixel value. A pixel-level variance is a variance corresponding to an individual pixel. To determine the pixel-level variance for an individual pixel, the processor can determine a difference between the pixel value and the average pixel value, and then compute the square of the difference. After determining the pixel-level variances for some or all of the pixels in the block, the processor can determine a block-level variance for the block based on the pixel-level variances. For instance, the processor can combine (e.g., sum) the pixel-level variances together to determine the block-level variance. One example of this process is shown in FIG. 6, which depicts a block 602 of a video frame 600. The block is 8×8 pixels. Pixel-level variances have been computed for all 64 pixels of the block 602, though only variances V1-V8 and V64 are shown in FIG. 6 for simplicity. The block-level variance is then determined by combining together the pixel-level variances.

Continuing with FIG. 4, in step 410 the processor determines whether the variance associated with the selected block is less than a predefined threshold. One example of a threshold may be 16. If the variance associated with the selected block is greater than or equal to the threshold, the process can continue to step 412. This is because blocks with variances above the threshold may depict a texture or other content with intentionally high variance, so those blocks may not undergo the further processing described in FIG. 7, since that could blur the content. If the variance associated with the selected block is below the threshold, the process can undergo the further processing described in FIG. 7. This is because blocks with variances below the threshold may correspond to relatively "pure" blocks of the video frame that still happen to have some level of noise, which may be mitigated using the techniques described in FIG. 7.

Figure 7:
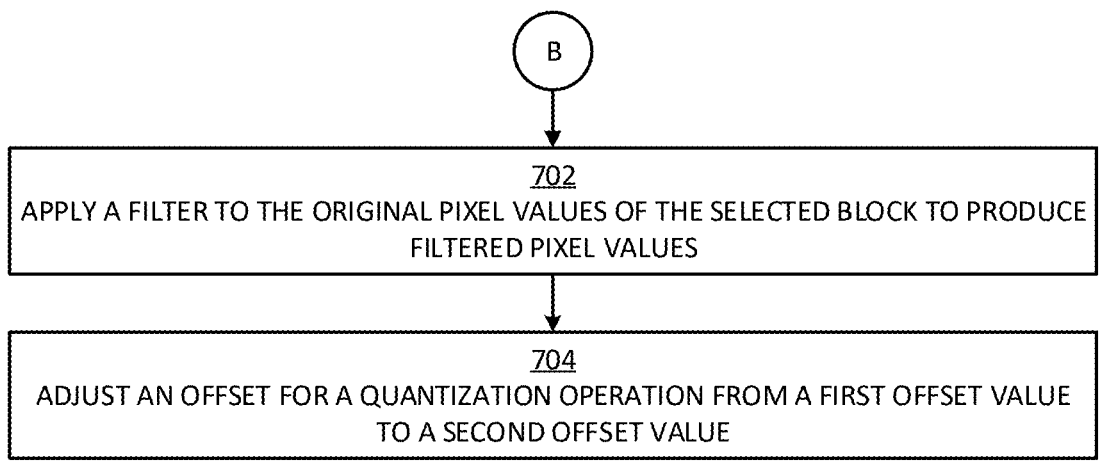
FIG. 7 shows a flowchart of an example of a process for reducing noise with respect to a video frame according to some aspects of the present disclosure.

Now referring to the further processing shown in FIG. 7, in step 702 the processor can apply a filter to the original pixel values of the selected block to produce filtered pixel values. The filter may be a smoothing filter, such as a Gaussian filter, median filter, or mean filter. If the filter is a smoothing filter, then the filtered pixel values would be smoothed pixel values.

As used herein, the term "original pixel values" is simply used to differentiate from the filtered pixel values, and is intended to encompass whatever pixel values are associated with the selected block prior to filtering. Thus, the "original pixel values" are not necessarily the raw pixel values received directly from the camera; they may also include pixel values that have undergone some level of pre-processing prior to step 702. In some examples, the original pixel values may be the same pixel values used to compute the variance in step 408.

In step 704, the processor adjusts an offset for a quantization operation to be applied to the selected block. The offset is adjusted from a first offset value to a second offset value. For example, the processor can reduce the offset from a first offset value of 6 to a second offset value of 5. In this example, the difference (e.g., of 1) between the first offset value and the second offset value can be referred to as an adjustment amount. The processor can adjust the offset for the quantization operation by subtracting the adjustment amount from the first offset value to arrive at the second offset value.

The first offset value can be a predefined value, such as a default value determined prior to initiating the process of FIG. 4. Some or all blocks in the video frame that have variances greater than or equal to the predefined threshold can be quantized using the first offset value. The second offset value may also be a predefined value, which may have been determined prior to initiating the process of FIG. 4. Some or all blocks in the video frame that have variances below the threshold can be quantized using the second offset value. Thus, the offset value used to quantize any given block in the video frame can be dynamically changed depending on the block's corresponding variance.

The second offset value may be selected to decrease the total number of non-zero-valued frequency residuals output from the quantization operation (and thus increase the total number of zero-valued frequency residuals), which can alleviate noise in the selected block. To determine the second offset value, different values can be tried until one ultimately produces the desired result, namely reducing the total number of positive-valued frequency residuals output from the quantization process to a suitable level that alleviates noise.

After completing steps 702 and/or step 704 of FIG. 7, the process can continue to step 412 of FIG. 4. In step 412, the processor can generate a predicted block based on the selected block. The predicted block can be a predicted version of the selected block, where the predicted block has the same size and the same number of pixels as the selected block. For example, if the selected block is 32×32 pixels, the predicted block will also be 32×32 pixels. The predicted block can be generated using any suitable technique, such as intra-frame prediction or inter-frame prediction. Intra-frame prediction exploits spatial redundancy (e.g., correlation among pixels) in a video frame by calculating prediction values through extrapolation from already coded pixels in the video frame. With intra-frame prediction, only information from the current video frame is used to generate the predicted block, and thus the prediction is not relative to any other video frame in the video sequence.

In step 414, the processor generates spatial residuals based on the predicted block. For example, the processor can subtract a first set of pixel values associated with the predicted block from a second set of pixel values associated with selected block (or vice versa), to produce a residual block expressing the difference between the predicted block and the selected block. The residual block can be the same size as the selected block and the predicted block—e.g., 32×32 pixels. The values in the residual block can be referred to as spatial residuals, because they are in the spatial domain. Each spatial residual can be a numerical value representing the difference between (i) a first pixel value associated with the predicted block and (ii) a second pixel value associated with the selected block. In some examples, the second pixel value may be an original pixel value associated with the selected block (e.g., if step 702 was not applied). In other examples, the second pixel value can be a filtered pixel value associated with the selected block (e.g., if step 702 was applied).

In step 416, the processor transforms the spatial residuals into first frequency residuals. For example, the processor can execute a transform operation in which a transform function is applied to the spatial residuals to convert them into frequency-domain coefficients, which are also referred to herein as frequency residuals. Examples of the transform function can include a discrete cosine transform or a discrete wavelet transform.

In step 418, the processor applies a quantization operation with a selected offset value to the first frequency residuals. If the variance was greater than or equal to the threshold in step 410, then the selected offset value can be the first offset value. If the variance was less than the threshold in step 410, then the selected offset value can be the second offset value (e.g., following the adjustment made in step 704). The second offset value can be less than the first offset value. The output of the quantization operation can be second frequency residuals. If the second offset value was used, the second frequency residuals may have more zero-valued frequency residuals than if the first offset value was used.

In step 420, the processor executes one or more coding operations on the second frequency residuals to finish encoding the selected block. For example, the processor may perform run-length coding and/or variable-length encoding and/or arithmetic coding, using the second frequency residuals as input, in order to finish encoding the selected block.

In step 422, the processor determines whether a stopping condition has been satisfied. One example of the stopping condition may be that all of the blocks have been evaluated. If the stopping condition has not been satisfied, the process can return to step 406, at which point another block can be selected and the process can repeat. Otherwise, the process can end. Using these techniques, the processor can automatically identify low-variance blocks and help mitigate any remaining noise therein.

Figure 8:
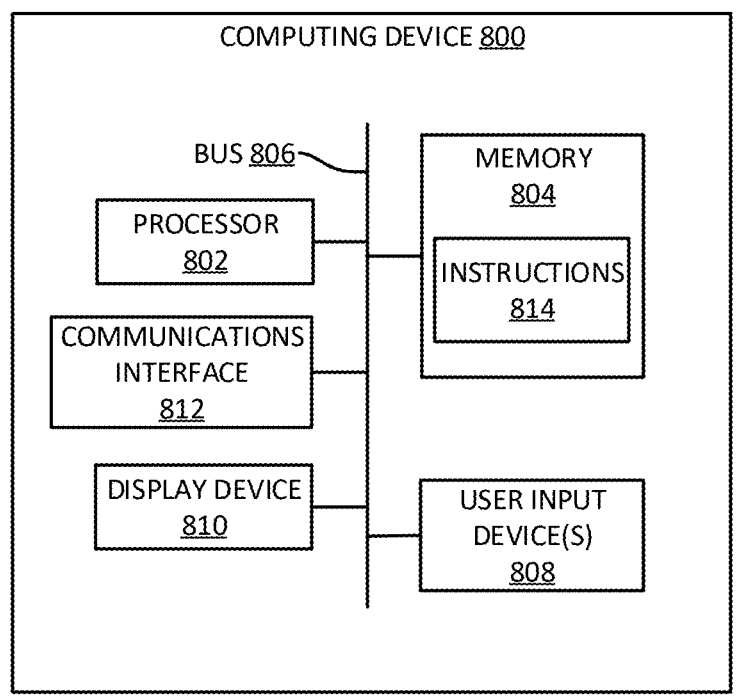
FIG. 8 shows a block diagram of an example of a computing device usable to implement some aspects of the present disclosure.

FIG. 8 shows a block diagram of an example of a computing device 800 usable to implement some aspects of the present disclosure. In some examples, the computing device 800 may correspond to any of the client devices described above, such as client devices 140-180 of FIG. 1 or 220-250 of FIG. 2.

The computing device 800 includes a processor 802 that is in communication with the memory 804 and other components of the computing device 800 using one or more communications buses 806. The processor 802 is configured to execute processor-executable instructions 814 stored in the memory 804 to perform one or more processes described herein. In some examples, the instructions 814 may correspond to the video encoder 290 of FIG. 2.

As shown, the computing device 800 also includes one or more user input devices 808 (e.g., a keyboard, mouse, touchscreen, video capture device, and/or microphone) to accept user input and the display device 810 to provide visual output to a user. The computing device 800 further includes a communications interface 812. The communications interface 812 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of computer-readable medium may include, but are not limited to, an electronic, optical, magnetic, or other storage device capable of providing a processor, such as the processor in a videoconferencing server, with processor-executable instructions. Other examples of computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: A method comprising: dividing, by one or more processors, a video frame into a set of blocks; determining, by the one or more processors, a variance associated with a block in the set of blocks; determining, by the one or more processors, that the variance is below a predefined threshold; generating, by the one or more processors, first frequency residuals associated with the block; in response to determining that the variance is below the predefined threshold, adjusting, by the one or more processors, an offset to be used during a quantization operation from a first offset value to a second offset value; and applying, by the one or more processors, the quantization operation to the first frequency residuals using the second offset value to generate second frequency residuals, the second frequency residuals having more zero-valued frequency residuals than the first frequency residuals.

Example #2: The method of Example #1, further comprising: generating a predicted block based on the block, the block including a first set of pixel values, and the predicted block including a second set of pixel values for the block; and generating spatial residuals for the block based on the first set of pixel values and the second set of pixel values.

Example #3: The method of Example #2, further comprising: transforming the spatial residuals into the first frequency residuals using a transform function.

Example #4: The method of any of Examples #1-3, further comprising: executing one or more encoding operations on the second frequency residuals to encode the block, thereby generating an encoded block.

Example #5: The method of Example #4, wherein the one or more processors are part of a first client device associated with a first participant in a videoconference, and further comprising: transmitting the encoded block to a second client device associated with a second participant in the videoconference.

Example #6: The method of any of Examples #1-5, further comprising: determining an average pixel value for the block by averaging together original pixel values associated with the block; determining pixel-level variances associated with the original pixel values based on differences between the original pixel values and the average pixel value; and determining a block-level variance corresponding to the block based on the pixel-level variances, wherein the block-level variance serves as the variance to be compared to the predefined threshold.

Example #7: The method of any of Examples #1-6, further comprising: in response to determining that the variance is below the predefined threshold, and prior to generating the first frequency residuals, applying a smoothing filter to a set of pixels associated with the block.

Example #8: A non-transitory computer-readable medium comprising program code that is executable by one or more processors to cause the one or more processors to: divide a video frame into a set of blocks; determine a variance associated with a block in the set of blocks; determine that the variance is below a predefined threshold; generate first frequency residuals associated with the block; in response to determining that the variance is below the predefined threshold, adjust an offset to be used during a quantization operation from a first offset value to a second offset value; and apply the quantization operation to the first frequency residuals using the second offset value to generate second frequency residuals, the second frequency residuals having more zero-valued frequency residuals than the first frequency residuals.

Example #9: The non-transitory computer-readable medium of Example #8, further comprising program code that is executable by the one or more processors to cause the one or more processors to: generate a predicted block based on the block, the block including a first set of pixel values, and the predicted block including a second set of pixel values for the block; and generate spatial residuals for the block based on the first set of pixel values and the second set of pixel values.

Example #10: The non-transitory computer-readable medium of any of Examples #8-9, further comprising program code that is executable by the one or more processors to cause the one or more processors to: transform the spatial residuals into the first frequency residuals using a transform function.

Example #11: The non-transitory computer-readable medium of any of Examples #8-10, further comprising program code that is executable by the one or more processors to cause the one or more processors to: execute one or more encoding operations on the second frequency residuals to encode the block, thereby generating an encoded block.

Example #12: The non-transitory computer-readable medium of Example #11, wherein the one or more processors are part of a first client device associated with a first participant in a videoconference, and further comprising program code that is executable by the one or more processors to cause the one or more processors to: transmit the encoded block to a second client device associated with a second participant in the videoconference.

Example #13: The non-transitory computer-readable medium of any of Examples #8-12, further comprising program code that is executable by the one or more processors to cause the one or more processors to: determine an average pixel value for the block by averaging together original pixel values associated with the block; determine pixel-level variances associated with the original pixel values based on differences between the original pixel values and the average pixel value; and determine a block-level variance corresponding to the block based on the pixel-level variances, wherein the block-level variance serves as the variance to be compared to the predefined threshold.

Example #14: The non-transitory computer-readable medium of any of Examples #8-13, further comprising program code that is executable by the one or more processors to cause the one or more processors to: in response to determining that the variance is below the predefined threshold, and prior to generating the first frequency residuals, apply a smoothing filter to a set of pixels associated with the block.

Example #15: A system comprising: one or more processors; and one or more memories including instructions that are executable by the one or more processors to cause the one or more processors to: divide a video frame into a set of blocks; determine a variance associated with a block in the set of blocks; determine that the variance is below a predefined threshold; generate first frequency residuals associated with the block; in response to determining that the variance is below the predefined threshold, adjust an offset to be used during a quantization operation from a first offset value to a second offset value; and apply the quantization operation to the first frequency residuals using the second offset value to generate second frequency residuals, the second frequency residuals having more zero-valued frequency residuals than the first frequency residuals.

Example #16: The system of Example #15, wherein the one or memories further comprises instructions that are executable by the one or more processors to cause the one or more processors to: generate a predicted block based on the block, the block including a first set of pixel values, and the predicted block including a second set of pixel values for the block; and generate spatial residuals for the block based on the first set of pixel values and the second set of pixel values.

Example #17: The system of any of Examples #15-16, wherein the one or memories further comprises instructions that are executable by the one or more processors to cause the one or more processors to: transform the spatial residuals into the first frequency residuals using a transform function.

Example #18: The system of any of Examples #15-17, wherein the one or memories further comprises instructions that are executable by the one or more processors to cause the one or more processors to: execute one or more encoding operations on the second frequency residuals to encode the block, thereby generating an encoded block.

Example #19: The system of any of Examples #15-18, wherein the one or memories further comprises instructions that are executable by the one or more processors to cause the one or more processors to: determine an average pixel value for the block by averaging together original pixel values associated with the block; determine pixel-level variances associated with the original pixel values based on differences between the original pixel values and the average pixel value; and determine a block-level variance corresponding to the block based on the pixel-level variances, wherein the block-level variance serves as the variance to be compared to the predefined threshold.

Example #20: The system of any of Examples #15-19, wherein the one or memories further comprises instructions that are executable by the one or more processors to cause the one or more processors to: in response to determining that the variance is below the predefined threshold, and prior to generating the first frequency residuals, apply a smoothing filter to a set of pixels associated with the block.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
receiving, by one or more processors, a video frame of a video stream, the video stream comprising a plurality of video frames;
dividing, by one or more processors, the video frame into a set of blocks;
selecting a block of the set of blocks;
determining, by the one or more processors, a variance associated with a block in the set of blocks;
determining, by the one or more processors, that the variance is below a predefined threshold;
generating, by the one or more processors, first frequency residuals associated with the block;
in response to determining that the variance is below the predefined threshold, adjusting, by the one or more processors, an offset to be used during a quantization operation from a first offset value to a second offset value; and
applying, by the one or more processors, the quantization operation to the first frequency residuals using the second offset value to generate second frequency residuals, the second frequency residuals having more zero-valued frequency residuals than the first frequency residuals;
encoding the block based on the second frequency residuals; and
generating an encoded video frame based on the block.

2. The method of claim 1, further comprising:
generating a predicted block based on the block, the block including a first set of pixel values, and the predicted block including a second set of pixel values for the block; and
generating spatial residuals for the block based on the first set of pixel values and the second set of pixel values.

3. The method of claim 2, further comprising:
transforming the spatial residuals into the first frequency residuals using a transform function.

4. The method of claim 1, wherein the one or more processors are part of a first client device associated with a first participant in a videoconference, and further comprising:
transmitting the encoded video frame to a second client device associated with a second participant in the videoconference.

5. The method of claim 1, further comprising:
determining an average pixel value for the block by averaging together original pixel values associated with the block;
determining pixel-level variances associated with the original pixel values based on differences between the original pixel values and the average pixel value; and
determining a block-level variance corresponding to the block based on the pixel-level variances, wherein the block-level variance serves as the variance to be compared to the predefined threshold.

6. The method of claim 1, further comprising:
in response to determining that the variance is below the predefined threshold, and prior to generating the first frequency residuals, applying a smoothing filter to a set of pixels associated with the block.

7. A non-transitory computer-readable medium comprising program code that is executable by one or more processors to cause the one or more processors to:
receive a video frame of a video stream, the video stream comprising a plurality of video frames;
divide the video frame into a set of blocks;
select a block of the set of blocks;
determine a variance associated with a block in the set of blocks;
determine that the variance is below a predefined threshold;
generate first frequency residuals associated with the block;
in response to determining that the variance is below the predefined threshold, adjust an offset to be used during a quantization operation from a first offset value to a second offset value;
apply the quantization operation to the first frequency residuals using the second offset value to generate second frequency residuals, the second frequency residuals having more zero-valued frequency residuals than the first frequency residuals;
encode the block based on the second frequency residuals; and
generate an encoded video frame based on the block.

8. The non-transitory computer-readable medium of claim 7, further comprising program code that is executable by the one or more processors to cause the one or more processors to:
generate a predicted block based on the block, the block including a first set of pixel values, and the predicted block including a second set of pixel values for the block; and
generate spatial residuals for the block based on the first set of pixel values and the second set of pixel values.

9. The non-transitory computer-readable medium of claim 8, further comprising program code that is executable by the one or more processors to cause the one or more processors to:
transform the spatial residuals into the first frequency residuals using a transform function.

10. The non-transitory computer-readable medium of claim 7, wherein the one or more processors are part of a first client device associated with a first participant in a videoconference, and further comprising program code that is executable by the one or more processors to cause the one or more processors to:
transmit the encoded video frame to a second client device associated with a second participant in the videoconference.

11. The non-transitory computer-readable medium of claim 7, further comprising program code that is executable by the one or more processors to cause the one or more processors to:
determine an average pixel value for the block by averaging together original pixel values associated with the block;
determine pixel-level variances associated with the original pixel values based on differences between the original pixel values and the average pixel value; and
determine a block-level variance corresponding to the block based on the pixel-level variances, wherein the block-level variance serves as the variance to be compared to the predefined threshold.

12. The non-transitory computer-readable medium of claim 7, further comprising program code that is executable by the one or more processors to cause the one or more processors to:
   in response to determining that the variance is below the predefined threshold, and prior to generating the first frequency residuals, apply a smoothing filter to a set of pixels associated with the block.

13. A system comprising:
   one or more processors; and
   one or more memories including instructions that are executable by the one or more processors to cause the one or more processors to:
      receive a video frame of a video stream, the video stream comprising a plurality of video frames;
      divide the video frame into a set of blocks;
      select a block of the set of blocks;
      determine a variance associated with a block in the set of blocks;
      determine that the variance is below a predefined threshold;
      generate first frequency residuals associated with the block;
      in response to determining that the variance is below the predefined threshold, adjust an offset to be used during a quantization operation from a first offset value to a second offset value;
      apply the quantization operation to the first frequency residuals using the second offset value to generate second frequency residuals, the second frequency residuals having more zero-valued frequency residuals than the first frequency residuals;
      encode the block based on the second frequency residuals; and
      generate an encoded video frame based on the block.

14. The system of claim 13, wherein the one or memories further comprises instructions that are executable by the one or more processors to cause the one or more processors to:
   generate a predicted block based on the block, the block including a first set of pixel values, and the predicted block including a second set of pixel values for the block; and
   generate spatial residuals for the block based on the first set of pixel values and the second set of pixel values.

15. The system of claim 14, wherein the one or memories further comprises instructions that are executable by the one or more processors to cause the one or more processors to:
   transform the spatial residuals into the first frequency residuals using a transform function.

16. The system of claim 13, wherein the one or memories further comprises instructions that are executable by the one or more processors to cause the one or more processors to:
   determine an average pixel value for the block by averaging together original pixel values associated with the block;
   determine pixel-level variances associated with the original pixel values based on differences between the original pixel values and the average pixel value; and
   determine a block-level variance corresponding to the block based on the pixel-level variances, wherein the block-level variance serves as the variance to be compared to the predefined threshold.

17. The system of claim 13, wherein the one or memories further comprises instructions that are executable by the one or more processors to cause the one or more processors to:
   in response to determining that the variance is below the predefined threshold, and prior to generating the first frequency residuals, apply a smoothing filter to a set of pixels associated with the block.

\* \* \* \* \*